INVENTOR
MAURICE J. YODER
BY Hazard & Miller
ATTORNEYS

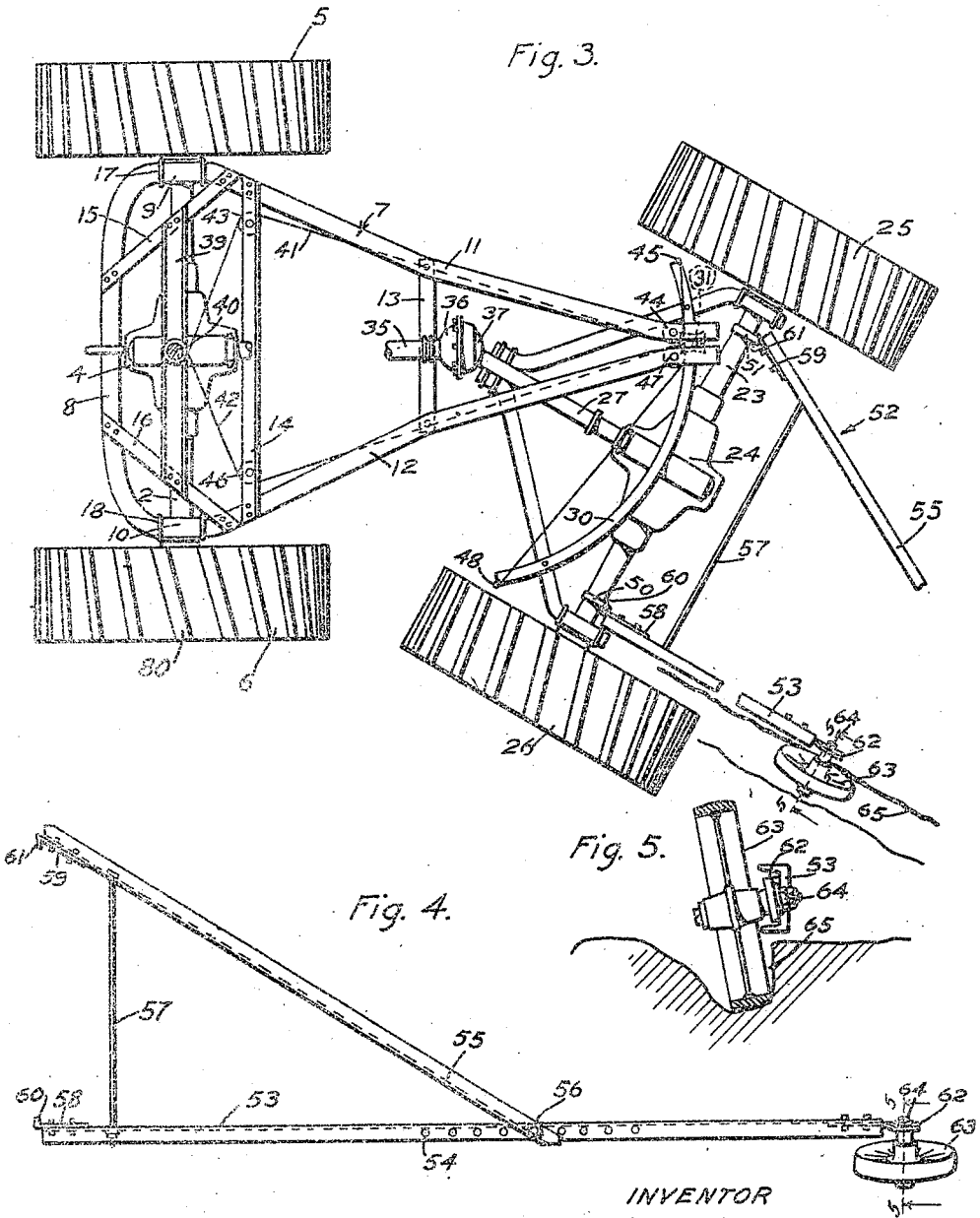

M. J. YODER.
MOTOR VEHICLE.
APPLICATION FILED JAN. 23, 1918.

1,272,757.

Patented July 16, 1918.
3 SHEETS—SHEET 3.

INVENTOR
MAURICE J. YODER
BY Hazard and Miller
ATTYS.

UNITED STATES PATENT OFFICE.

MAURICE J. YODER, OF HEMET, CALIFORNIA.

MOTOR-VEHICLE.

1,272,757.  Specification of Letters Patent.  Patented July 16, 1918.

Application filed January 23, 1918.  Serial No. 213,314.

*To all whom it may concern:*

Be it known that I, MAURICE J. YODER, a citizen of the United States, residing at Hemet, in the county of Riverside and State of California, have invented new and useful Improvements in Motor-Vehicles, of which the following is a specification.

My object is to make a tractor or motor vehicle in which the four wheels will be driven through differentials from a single engine.

A further object of my invention is to make a motor vehicle having a four wheel drive and a four wheel steer in which the four wheels are mounted on rigid axles.

A further object of my invention is to make a motor vehicle in which there is a pivoted and rocker connection between the two axles.

Another object of my invention is to provide a motor vehicle having an automatic steerer which will follow a furrow or the like.

Fig. 3 is a view analogous to Fig. 2 and showing the automatic steerer.

Fig. 4 is a top plan view of the automatic steerer removed from the running gear, the steerer being broken away in Fig. 3.

Fig. 5 is an enlarged cross-section on the lines 5—5 of Figs. 3 and 4.

Figure 1:
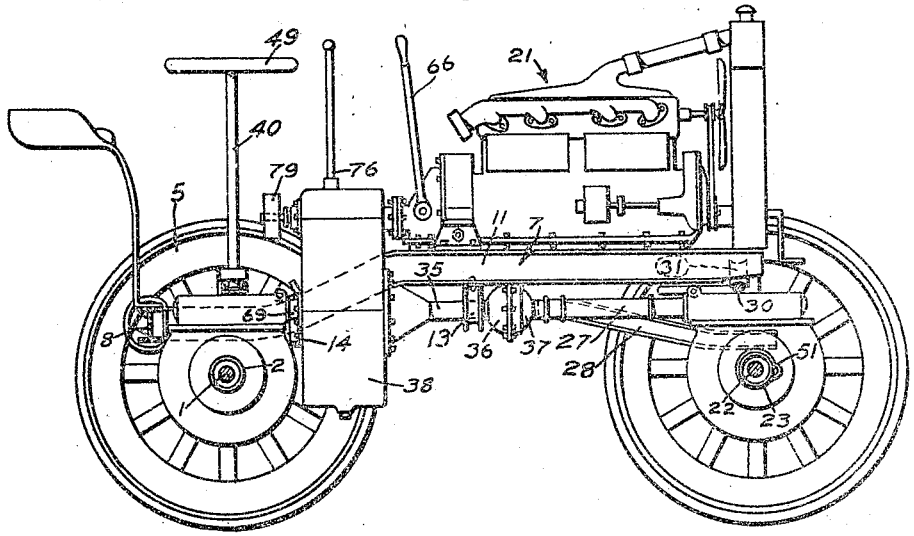
Figure 1 is a side elevation of a four wheel drive tractor embodying the principles of my invention, as seen looking in the direction of the arrow 1 in Fig. 2, with the near wheels removed and parts shown in section.
Figure 2:
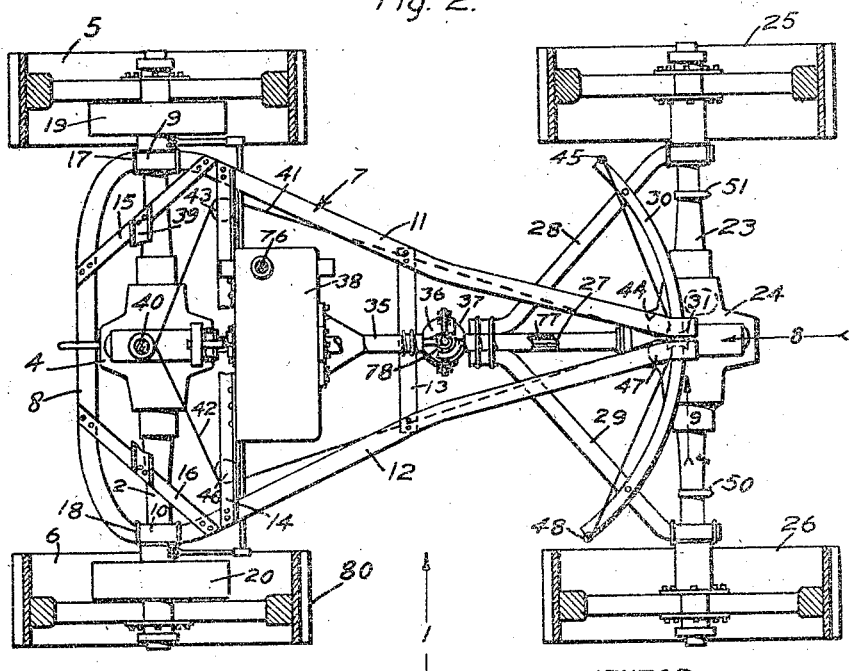
Fig. 2 is a top plan view of the running gear frame, the traction wheels being shown in horizontal section and the engine being removed.
Figure 6:
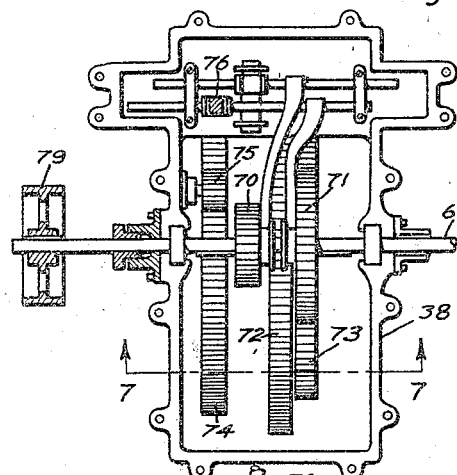
Fig. 6 is a top plan view of the transmission gear with the cap of the gear case removed, the view being taken substantially on the lines 6—6 of Figs. 1 and 7.
Figure 9:
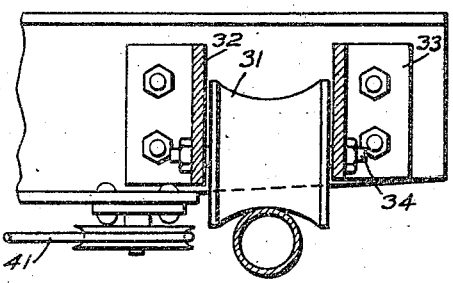
Fig. 9 is a fragmentary cross-sectional detail on the lines 9—9 of Figs. 2 and 8.
Figure 7:
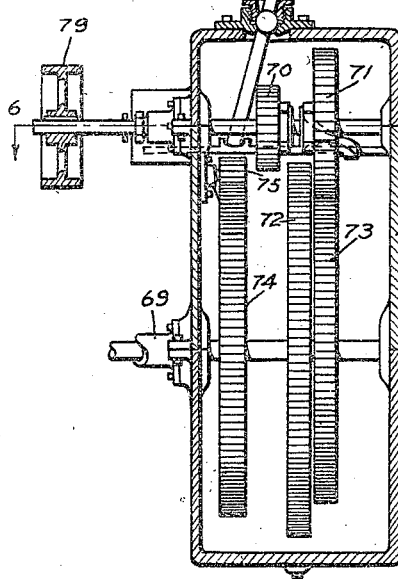
Fig. 7 is a vertical longitudinal section parallel with the crank shaft on a plane parallel with Fig. 1 and on the lines 7—7 of Figs. 2 and 6.
Figure 8:
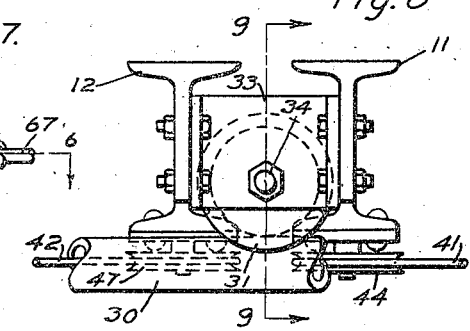
Fig. 8 is a fragmentary front elevation showing the rocker connection between the main frame and the front axle, the view being taken as indicated by the arrow 8 in Fig. 2.
Figure 10:
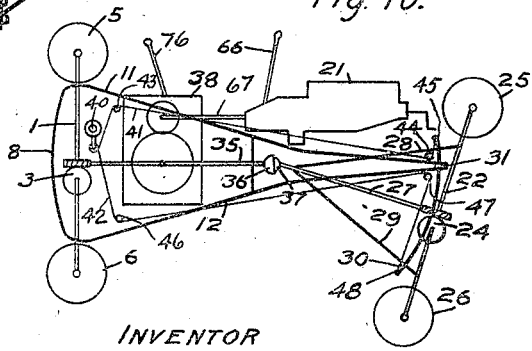
Fig. 10 is a diagrammatic view of the working parts.

The rear axle 1 is mounted in an axle housing 2. The rear axle 1 is provided with a differential gear 3 in the differential gear case 4, said gear case being a part of the housing 2. The rear wheels 5 and 6 are fixed upon the axle 1.

The bed frame 7 is rigidly fixed upon the axle housing 2 and the details of this frame are as follows: A single I-beam is bent to form the rear cross piece 8, the parallel side portions 9 and 10 extending forwardly from the ends of the cross piece 8, and the inclined side portions 11 and 12 extending forwardly from the portions 9 and 10, said portions 11 and 12 being inclined inwardly so as to come close together at their forward ends; a transverse brace 13 connecting the central portions of the side pieces 11 and 12, a transverse brace 14 connecting the rear portions of the side pieces 11 and 12, and the diagonal braces 15 and 16 connecting the rear ends of the side pieces 11 and 12 to the intermediate portion of the cross piece 8, said braces 15 and 16 passing above the axle housing 2. Clamps 17 and 18 connect the portions 9 and 10 rigidly to the axle housing 2.

The wheels 5 and 6 are keyed upon the axle 1 so as to be driven with the axle. Brake wheels 19 and 20 are rigid with the traction wheels 5 and 6.

The engine construction 21 is mounted upon the A-shaped frame formed by the side pieces 11 and 12 and the cross piece 13.

The front axle 22 is mounted in the front axle housing 23 and is provided with a differential gear construction and housing 24, and the front wheels 25 and 26 are fixed upon the axle 22 to rotate therewith. The drive shaft housing 27 extends backwardly from the differential gear construction 24 and forms a part of the reach. Braces 28 and 29 connect the rear end of the housing 27 to the outer ends of the axle housing 23.

The rocker support 30 is formed of pipe, is curved to the arc of a circle in plan, and is secured to the braces 28 and 29 and rests upon the differential gear case 24. The rocker roller 31 is mounted to run upon the support 30. Bearing plates 32 and 33 are inserted between the forward ends of the side pieces 11 and 12 and the roller 31 is placed between these plates to rotate upon a shaft 34 inserted through the plates and through the roller, said shaft being parallel with the line of travel.

The rear portion 35 of the driving shaft housing is rigidly mounted upon the cross piece 13 and has a ball socket 36 upon its forward end in which the ball 37 operates, said ball 37 being fixed upon the front portion 27 of the housing so as to form a universal joint in the reach. The transmission gear case 38 is mounted upon the cross piece 14 and the rear end of the reach is rigidly connected to the front side of the gear case. The ball and socket joint between the portions 27 and 35 of the reach is concentric to the bolster or rocker support 30 so that the front axle 23 may turn upon the ball and socket joint as a center, as required to steer the vehicle to the right or the left.

The steering post support 39 is secured to the braces 15 and 16 directly above the axle housing 2 and the steering post shaft 40 extends vertically upwardly from the center of this support. The steering cables 41 and 42 are wound in opposite directions upon the shaft 40, and the cable 41 runs outwardly around a guide pulley 43 mounted below the cross bar 14, then forwardly inside of and around a guide pulley 44 mounted below the front end of the side piece 11, and then outwardly, and is attached to the pin 45 at the left-hand end of the rocker support 30, and the cable 42 runs outwardly around the guide pulley 46 and forwardly and inwardly around the guide pulley 47 and then outwardly and is attached to the pin 48 t the right-hand end of the support 30, so that by manipulating the hand-wheel 49 upon the upper end of the post 40 the forward end of the bed 7 may be pulled one way or the other to steer the vehicle.

When the front wheels are running upon ground that is tilted relative to the ground upon which the hind wheels are running, one of the front wheels may raise relative to the other and at this time the ball 37 will turn rotatably in the socket 37 and the forward ends of the side pieces 11 and 12 may rock upon the roller 31 relative to the support 30 and the front axle may turn relative to the rear axle in plan, as shown in Fig. 3, in either direction, and this turning of the front axle to guide the vehicle is controlled by the hand-wheel 49.

Clips 50 and 51 are attached to the front axle housing 23 and the automatic steerer 52 is removably attached to these clips. The details of the automatic steerer are as follows: A long bar 53 has a series of bolt holes 54 extending both ways from its center. A brace 55 is adjustably secured to the bar 53 by a bolt 56 inserted through the forward end of the brace, and through one of the bolt holes 54, so that the brace 55 may be adjusted relative to the bar 53 by manipulating the bolt 56 relative to the bolt holes 54. A cross brace 57 connects the rear ends of the bar 53 and brace 55. Hooks 58 and 59 are secured to the inner faces of the rear ends of the bar 53 and brace 55 and extend backwardly, the inturned ends 60 and 61 of the hooks fitting in sockets in the clips 50 and 51. A bearing plate 62 is bolted to the front end of the bar 53 and slightly twisted. The steering wheel 63 is rotatably secured to the plate 62 by a bolt 64 so that the wheel 63 is set at an angle to the surface of the ground. When it is desired to use the tractor for plowing, the automatic steerer 52 is applied and the steering wheel 63 will run in the furrow 65 against the land-side and will automatically steer the tractor to follow the furrow.

When the use of the automatic steerer is not desired, the bolt 56 may be removed and the inturned ends 60 and 61 of the hooks disconnected from their sockets.

The lever 66 controls the clutch in the crank case of the engine 21 to connect and disconnect the transmission shaft 67. The transmission shaft 67 is mounted in direct line with the crank shaft of the engine and is mounted in the transmission case 38. The rear drive shaft 68 extends through the transmission case 38 parallel with the transmission shaft 67 and extends through the housing 35 forming the rear part of the reach and through the housing 69 extending backwardly from the case 38 to the differential case 4. The low speed and reverse pinion 70 is slidingly splined upon the shaft 67 and the high speed gear 71 is also slidingly splined upon the shaft. The low speed transmission gear 72 is fixed upon the shaft 68 in position to be engaged by the gear 70 and the high speed transmission gear 73 is fixed upon the shaft 68 in position to be engaged by the gear 71. The reverse gear 74 is fixed upon the shaft 68 and meshes with the reversing pinion 75, said reversing pinion being in position to be engaged by the gear 70. The shift lever mechanism 76 operates the gears 70 and 71.

The front drive shaft 77 is mounted in the forward part of the reach 27 and connects with the front differential construction 24, the rear end of the shaft 77 being connected to the forward end of the shaft 68 by a tumbling rod joint 78, so that the differentials 4 and 24 are driven simultaneously to drive the four wheels of the vehicle simultaneously and differentially. A pulley 79 is fixed upon the rear end of the shaft 67 for any desired use. The tread cleats 80 are fixed upon the peripheries of the wheels 5, 6, 25 and 26 for traction purposes.

Thus I have produced a motor vehicle and especially a tractor having a flexible running gear so that the front axle may swing relative to the rear axle and rock the same as in an old style wagon, and I have applied a power plant to this running gear so that each of the four wheels is simultaneously and differentially driven and steered, and I have provided an automatic steerer in the nature of a wagon tongue, there being a wheel upon the forward end of the tongue adapted to run in a furrow and cause the vehicle to follow the furrow.

Especial attention is called to the jointed reach connecting the front axle to the rear axle and to the jointed driving shaft extending through the reach from the rear differential to the front differential so that the joint in the reach and the joint in the driving shaft turn about the same center and produce a flexible connection, and attention is also called to the rocking support upon the front axle for carrying the forward end of the bed or main frame which is secured to the rear axle.

While I have shown the preferred construction of my motor vehicle as now known to me, it will be understood by those skilled in the art that various changes in the combination, construction and arrangement of parts may be made without departing from the spirit of my invention as claimed.

I claim:

1. In a motor vehicle, a rear differential axle, a front differential axle, a reach member extending backwardly from the front axle, a reach member extending forwardly from the rear axle, means forming a ball and socket joint between the reach members, a bed fixed upon the rear axle, a rocker support fixed upon the forward axle, and means connecting the forward end of the bed to the rocker support.

2. In a motor vehicle, a rear differential axle, a front differential axle, an axle housing upon the rear differential axle, an axle housing upon the front differential axle, a bed frame rigidly mounted upon the rear differential axle housing and extending to the vertical plane of the front differential axle housing, a drive shaft housing extending forwardly from the rear axle housing and forming a reach member, a drive shaft housing extending backwardly from the front axle housing and forming a second reach member, means forming a ball and socket joint between the two reach members, a rocker support mounted upon the forward axle housing, and a rocker roller mounted at the forward end of the bed frame and running upon the rocker support.

3. In a motor vehicle, a rear differential axle, a front differential axle, an axle housing upon the rear differential axle, an axle housing upon the front differential axle, a bed frame rigidly mounted upon the rear differential axle housing and extending to the vertical plane of the front differential axle housing, a drive shaft housing extending forwardly from the rear axle housing and forming a reach member, a drive shaft housing extending backwardly from the front axle housing and forming a second reach member, means forming a ball and socket joint between the two reach members, a rocker support mounted upon the forward axle housing, a rocker roller mounted at the forward end of the bed frame and running upon the rocker support, a steering post shaft mounted vertically at the center of the rear end of the bed frame, guide rollers in the bed frame, and cables oppositely wound upon the steering post shaft and extending over the guide rollers to the outer ends of the rocker support.

In testimony whereof I have signed my name to this specification.

MAURICE J. YODER.